United States Patent Office 3,546,145
Patented Dec. 8, 1970

3,546,145
POLYURETHANE FOAMS PREPARED FROM MIXTURES OF POLYETHER POLYOLS
Camille Granger, Lavera, Gerard Repiquet, Martigues, Michel Buisson, Lavera, and Jean Dausque, Boulogne, France, assignors to Naphtachimie, Paris, France
No Drawing. Filed May 12, 1967, Ser. No. 637,939
Claims priority, application France, May 26, 1966, 63,065
Int. Cl. C08g 22/46
U.S. Cl. 260—2.5   6 Claims

ABSTRACT OF THE DISCLOSURE

The preparation of a foamed polyurethane by reaction of an organic polyisocyanate and a mixture of (1) polyetherpolyols having an equivalent molecular weight of 300 to 2000 per terminal hydroxyl group and formed by the reaction of ethylene oxide, 1,2-propylene oxide and/or 1,2-butylene oxide and a polyol with ethylene oxide constituting 20–60% of the oxide component and (2) a polyether-polyol having an equivalent molecular weight between 300 and 2000 per terminal hydroxyl group and formed by the reaction of 1,2-propylene oxide and a polyol, with 10–75% by weight of the mixtures of (1) and (2) having groups derived from ethylene oxide and foaming the mixture of polyisocyanate and the polyether-polyols.

---

This invention relates to the preparation of improved polyurethane foams.

It is known to prepare polyurethane foams from organic polyisocyanates and polyhydroxylated compounds, such as polyether-polyols produced by the reaction of propylene oxide and a polyol. The reaction is effected in the presence of a catalyst and a tensio-active or surface active agent, the foaming being produced by means of an expansion agent.

It is also known, as described in U.S. Pat. No. 3,061,557, filed Dec. 12, 1957, to prepare polyurethane foams of copolymers produced by the reaction of ethylene oxide and propylene oxide on a polyol for the polyether polyol, in which the oxides may have reacted either in succession, to produce block copolymers, or together in the form of a mixture.

It has been found that it is possible to produce polyurethane—polyether foams having improved physical characteristics and which are insensitive to variations in catalyst concentration by using, instead of the polyhydroxylated compound, mixtures produced by adding to polyether polyols of the types currently used for the production of polyurethane foams, prepared by the reaction of propylene oxide and a polyol, a polyether-polyol produced by the reaction of ethylene oxide and 1,2-propylene oxide and/or 1,2-butylene oxide with a polyol.

It has been found that the use of such polyether-polyol mixtures permit a marked reduction in the amount of catalyst and tensio-active agent required thereby to favorably influence the cost of production of the foam.

It is an object of this invention to provide a process for preparing improved polyurethane foams which comprises preparing in a first stage, a polyether-polyol having an equivalent molecular weight within the range of 300 to 2000 per terminal hydroxyl group by reacting ethylene oxide and 1,2-propylene oxide and/or 1,2-butylene oxide with a polyol, with 20–60% by weight of the oxides reacted with the polyol comprising ethylene oxide. In a second stage, the oxyethylated polyether-polyol previously produced is mixed with a polyether-polyol having an equivalent molecular weight within the range of 300 to 2000 per terminal hydroxyl group and which is prepared by the reaction of 1,2-propylene oxide and a polyol and in which 10–75% by weight of the resulting mixture of polyether-polyols comprises the polyol containing ethylene oxide.

In a third stage, the polyurethane foams are prepared from the mixture of polyethers produced, as described above, and organic polyisocyanates.

An important object of this invention resides also in the polyether-polyols, the mixtures of polyether-polyols and the polyurethane foams which correspond respectively to those produced in accordance with the three stages of the process as defined above.

In accordance with the practice of this invention, the reaction of addition of ethylene oxide and 1,2-propylene oxide and/or 1,2-butylene oxide may be effected upon a polyol, such as a glycol represented by diethylene glycol or dipropylene glycol, or a triol as represented by glycerine or trimethylol propane, or by a tetrol as represented by pentaerythritol, or by a hexol such as sorbitol. The polyol is reacted either in succession with the various oxides or in the form of a mixture of the oxides but this reaction is preferably effected by first fixing the ethylene oxide on the polyol and then fixing the 1,2-propylene oxide and/or 1,2-butylene oxide on the product of addition which has been obtained. Instead, a part of the 1,2-propylene oxide and/or 1,2-butylene oxide may be fixed first on the polyol followed by the ethylene oxide and finally the remainder of the 1,2-propylene oxide and/or 1,2-butylene oxide.

The reaction of addition of the alkylene oxides and the polyol may be effected under moderate pressure, such for example as of the order of 5 to 10 kg./cm.$^2$ at a temperature within the range of 80°–160° C. but preferably about 130° C. The reaction is carried out in the presence of an alkaline catalyst such as soda or potash in which the catalyst is present in an amount within the range of 0.1 to 1% by weight based upon the total of the ingredients.

With a view towards removing traces of catalyst remaintaining in the product, the product obtained is subsequently treated by means of an acid in accordance with the procedures well known to the art.

The polyether-polyol, thus produced, containing groups derived from ethylene oxide, may be mixed with any known poly(1,2-propylene oxide)polyol of the type currently employed in the production of polyurethanes. In particular, it may be mixed with the products of addition of propylene oxide and a diol, such as dipropylene glycol, or a triol, such as glycerine, or trimethylol propane, or a tetrol such as pentaerythritol, or a hexol such as sorbitol.

The polyether mixtures prepared in accordance with the practice of this invention are particularly adapted for the production of flexible polyurethane foams by any of the conventional methods currently employed. Any of the known organic polyisocyanates may be used as the polyisocyanate, with toluene diisocyanate and diphenylmethane diisocyanate being particularly well suited.

Water or a halogenated hydrocarbon, such as the Freons represented by trichloromonofluoromethane, may be used as swelling or foaming agents. Silicone oils may be used as the tensio-active agent and tertiary amines or compounds of them may be used as catalysts.

The following examples are given by way of illustration, but not by way of limitation, of the practice of this invention:

EXAMPLE 1

184 parts by weight of glycerine and 0.07 part by weight of potash are introduced into an autoclave. 1420 parts of ethylene oxide is progressively added and the temperature is raised to about 135° C. A polyether having a molecular weight of approximately 800 is produced.

To 400 parts by weight of the above, there is added 5.2 parts by weight of potash and 1350 parts by weight of 1,2-propylene oxide while the temperature is maintained at 120° C.

When the reaction is completed, the reaction product is neutralized by hydrochloric acid, dehydrated and filtered. The polyether produced has a hydroxyl value of 57. The ratio by weight of ethylene oxide to the total of the oxides fixed is approximately 21%.

A foam is then prepared of the following formula using for the polyether polyol, a mixture containing 50% by weight of the polyether prepared above and 50% by weight of polyoxy 1,2-propylene glycerol having a molecular weight of 3500 and, for the isocyanate, use is made of a 80/20 toluene diisocyanate, which is a mixture of 80% and 20% respectively of the 2,4 and 2,6 isomers of toluene diisocyanate:

| | Parts by wt. |
|---|---|
| Polyether polyol mixture | 100 |
| Water | 4.0 |
| Silicone oil | 1.2 |
| 80/20 toluene diisocyanate | 50.0 |
| Triethylene diamine | 0.2 |
| Stannous octoate | 0.15 |

Mixing is effected by means of a centrifuge turning at 2000 revolutions per minute.

The foam produced has the following characteristics:
Density _____h./l__ 26.6
Resilience according to the standard ASTM D 1564–62T, percent _____ 39
Compression remaining after compression to 90% (according to the norm ASTM D 1564–62T) percent__ 5

EXAMPLE 2

1,976 parts by weight of ethylene oxide are reacted in an autoclave at a temperature of 140° C. on a mixture containing 184 parts by weight of glycerine and 0.12 part by weight of potash. An intermediary product having a molecular weight of approximately 1100 is thus obtained. To 550 parts by weight of this product are added 4.7 parts by weight of potash. 1170 parts of propylene oxide are reacted on this mixture at a temperature of 120° C.

When the reaction is completed, the product obtained is treated as in Example 1. A polyether having a hydroxyl value equal to 58 is thus produced; the ratio by weight of the ethylene oxide to the total of the oxides fixed is approximately 30%.

Five polyurethane foams are subsequently prepared from a mixture of polyether-polyols comprising 30% by weight of polyether produced as above, and 70% by weight of polyoxy 1,2-propylene glycerol having a molecular weight of 3500 according to the following formula, using for each one a different quantity of tin catalyst in the form of stannous octoate:

| | Parts by wt. |
|---|---|
| Mixture of polyether polyol | 100 |
| Water | 4.0 |
| Silicone oil | 1.2 |
| 80/20 toluene diisocyanate | 48.4 |
| Triethylene diamine | 0.2 |
| Stannous octate | variable from 0.15 to 0.40 |

The foams produced have the following characteristics:

| Quantity of stannous octoate used [1] | Density, g./liter | Resilience, percent [2] | Percentage of compression remaining, after compression of— [2] | | Hardness, kg. for a depression of— | | |
|---|---|---|---|---|---|---|---|
| | | | 50% | 90% | 25% | 50% | 65% |
| 0.15 | 26.9 | 41 | 3 | 6 | 4.85 | 6.6 | 9.2 |
| 0.25 | 26.8 | 41 | 6 | 10 | 4.95 | 7.0 | 9.65 |
| 0.30 | 26.4 | 39 | 6 | 20 | 4.75 | 6.75 | 9.25 |
| 0.35 | 26.0 | 37 | 7 | 32 | 4.90 | 6.9 | 9.25 |
| 0.40 | 25.5 | 32 | 7 | 60 | 5.15 | 7.1 | 9.25 |

[1] Parts by weight.
[2] According to the standard ASTM D 1564–62T.

The hardness measurement is carried out on a test piece of foam in the form of a parallelepiped rectangle with a square base of 20 cm. and 5 cm. in depth. A disc having a diameter of 105 mm. is applied onto this test piece. The hardness is expressed by the load in kilograms applied on the test piece of foam through the intermediary of the disc sufficient to cause a given depression of the foam.

From these results, it can be seen that the quantity of tin catalyst varying from approximrately 0.15 to 0.35 part by weight per 100 parts by weight of polyether gives no major variation in mechanical qualities, particularly resilience.

By way of comparison, foams according to the same formula were prepared, using a polyether comprising solely polyoxy 1,2-propylene glycerol having a molecular weight of 3500 instead of the mixture of polyethers, and varying the quantity of stannous octoate from 0.30 to 0.45 part by weight.

The foams produced have the following characteristics:

| Stannous octoate [1] | Density, g./l. | Resilience, percent [2] | Compression remaining, percent after a compression of— [2] | | Hardness kg. for a depression of— [2] | | |
|---|---|---|---|---|---|---|---|
| | | | 50% | 90% | 25% | 50% | 65% |
| 0.30 | 25.1 | 37 | 5 | 90 | 4.9 | 7.0 | 9.5 |
| 0.35 | 25.5 | 38 | 4 | 70 | 4.9 | 6.7 | 9.0 |
| 0.40 | 25.0 | 35 | 6 | 70 | 5.2 | 6.0 | 8.8 |
| 0.45 | 25.2 | 31 | 7 | 60 | 4.55 | 6.45 | 8.4 |

[1] Parts by weight.
[2] According to the standard ASTM D 1564–62T.

It will be seen that in addition, the foam having 0.30 part by weight of stannous octoate begins to show cracking. The result of this is that in this case, if foams equivalent to those according to the invention are to be produced, the quantity of tin catalyst used may vary between fairly narrow high range of approximately 0.30 to 0.40 part by weight.

EXAMPLE 3

618 parts by weight of 1,2-propylene oxide are reacted in an autoclave at a temperature of 110° C., on a mixture comprising 92 parts by weight of glycerine and 2.7 parts by weight of soda. When the reaction is completed, 1,683 parts by weight of ethylene oxide are introduced in the autoclave and 2,393 parts by weight of an intermediary product are then produced. To 1,470 parts by weight of this product are added 6 parts by weight of soda. 625 parts by weight of 1,2-propylene oxide are reacted on this mixture at a temperature of 105° C.

The product is then treated as in Example 1, so as to remove alkaline catalyst. A polyether-polyol having a hydroxyl value of 57 is produced, the ratio by weight of ethylene oxide to the total of the oxides fixed being approximately 50%.

Two foams having the following formula are produced with different quantities of catalyst with tin, from a mixture comprising 20% by weight of the polyether-polyol prepared as above and 80% by weight of polyoxy 1,2-propylene glycerol having a molecular weight of 3500:

| | Parts by wt. |
|---|---|
| Mixture of polyether-polyols | 100 |
| Water | 4 |
| Silicone oil | 1 |
| 80/20 toluene diisocyanate | 48.6 |
| Triethylene diamine | 0.15 |
| Stannous octoate | 0.1 and 0.2 |

The two foams produced are characterized by a high degree of resilience, as is shown in the following table:

|  | Density g./l. | Resilience, percent[1] |
|---|---|---|
| Stannous octance, parts by weight: |  |  |
| 0.1 | 31.4 | 46 |
| 0.2 | 28.1 | 42.5 |

[1] According to the standard ASTM D 1564-62T.

EXAMPLE 4

1,236 parts by weight of 1,2-propylene oxide are reacted in an autoclave at a temperature of 110° C. on a mixture comprising 184 parts by weight of glycerine and 5.5 parts by weight of soda.

A mixture comprising 900 parts by weight of ethylene oxide and 870 parts by weight of 1,2-propylene oxide are then reacted on a mixture of 458 parts by weight of the polyether previously produced and 6.6 parts by weight of soda.

When the reaction is completed, the product is treated as in Example 1. A polyether polyol having a hydroxyl value of 48.4 is obtained, comprising approximately 40% by weight of ethylene oxide in relation to the total oxide fixed.

Three polyurethane foams are then prepared from a single mixture of polyether-polyols comprising 25% by weight of polyether produced as above and 75% by weight of polyoxy 1,2-propylene glycerol having a molecular weight of 3500, with different quantities of catalyst with tin, according to the following formula:

| | Parts by wt. |
|---|---|
| Mixture of polyether-polyols | 100 |
| Water | 4 |
| Silicone oil | 1 |
| 80/20 toluene diisocyanate | 48.4 |
| Triethylene diamine | 0.15 |
| Stannous octoate | 0.2–0.3–0.4 |

The foams produced have the following characteristics:

|  | Density g./l. | Resilience percent |
|---|---|---|
| Stannous octance, by weight: |  |  |
| 0.2 | 30.0 | 45.5 |
| 0.3 | 29.5 | 44 |
| 0.4 | 27.7 | 41 |

[1] According to the standard ASTM D 1564 62T.

EXAMPLE 5

With the mixture of polyether-polyols used in Example 1, a series of foams comprising decreasing quantities of silicone oil is prepared, according to the following formula:

| | Parts by wt. |
|---|---|
| Mixture of polyether-polyols | 100 |
| Water | 4 |
| Silicone oil | variable decreasing quantities |
| 80/20 toluene diisocyanate | 48.4 |
| Triethylene diamine | 0.2 |
| Stannous octoate | 0.2 |

It has been found that the foams produced begin to collapse when the quantity of silicone oil falls below 0.3 part by weight; this quantity must be considered as critical.

By way of comparison, the critical quantity is 0.6 part by weight when the operation is effected with the same formula, but in which the mixture of polyether-polyols is replaced by a polyoxy 1,2-propylene glycerol having a molecular weight of 3500.

It will be understood that changes may be made in the details of materials and procedure without departing from the spirit of the invention, especially as defined in the following claims.

We claim:
1. A foamed polyurethane prepared by mixing an organic polyisocyanate with a mixture of polyether polyols having an equivalent molecuar weight within the range of 300 to 2000 and consisting of (1) 10–75% by weight of a polyether polyol formed by the reaction of polyol with ethylene oxide and an oxide selected from the group consisting of 1,2-propylene oxide and 1,2-butylene oxide and mixtures thereof, in which the ethylene oxide constitutes 20–60% by weight of the oxide component, and (2) 90–25% by weight of a polyether polyol formed by the reaction of a polyol with 1,2-propylene oxide, and foaming the mixture of the organic polyisocyanate and polyether polyols.

2. The product of claim 1 in which the polyether polyol (1) is produced by reacting ethylene oxide and glycerine to form an intermediate reaction product and reacting said product with propylene oxide.

3. The product of claim 1 in which the polyether polyol (2) is produced by the reaction of 1,2-propylene oxide and glycerine.

4. A foamed polyurethane as claimed in claim 1 in which the polyols employed in the preparation of the polyether polyols of (1) and (2) are selected from the group consisting of diols, triols, tetrols and hexols.

5. A foamed polyurethane as claimed in claim 4 wherein the polyol is a diol selected from the group consisting of diethylene glycol and dipropylene glycol.

6. A foamed polyurethane as claimed in claim 4 wherein the polyol is a triol selected from the group consisting of glycerine and trimethylol propane.

References Cited
UNITED STATES PATENTS 3,194,773    7/1965    Hostettler _____ 260—2.5

DONALD E. CZAJA, Primary Examiner

M. J. WELSH, Assistant Examiner